United States Patent Office 3,281,944
Patented Nov. 1, 1966

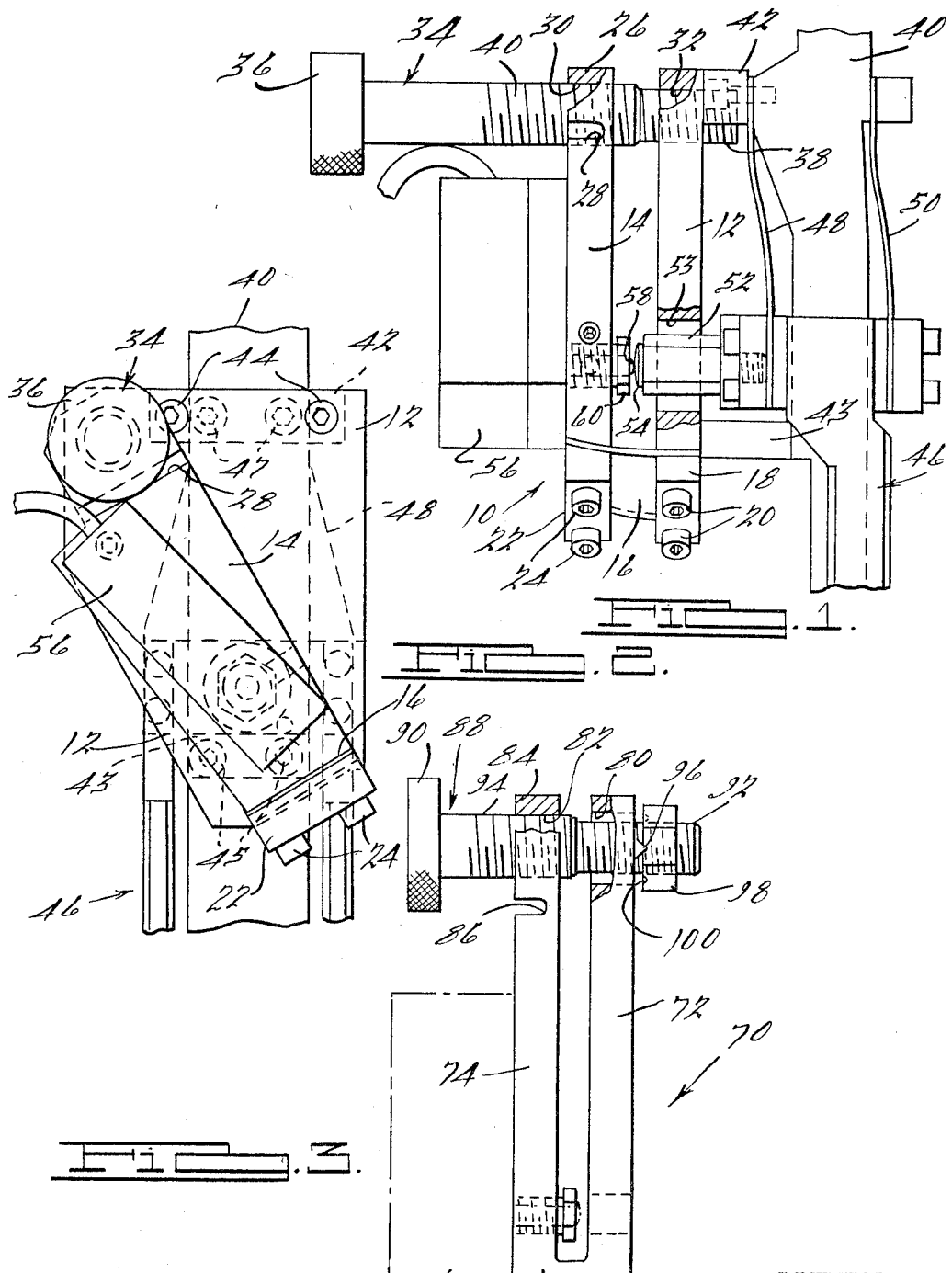

3,281,944
VERNIER ADJUSTMENT
Charles W. Youngblood, Royal Oak, Mich., assignor to Micromatic Hone Corporation, Detroit, Mich., a corporation of Michigan
Filed Aug. 28, 1964, Ser. No. 392,835
14 Claims. (Cl. 33—163)

This invention relates to measuring apparatus and more particularly to devices for use with measuring apparatus for making precision adjustments of the distance between two gauging members the relative distance or changes in relative distance therebetween being used as an indication of a measured dimension.

In making various dimensional measurements, often an indication of the measured dimension is obtained by means of the relative movement between two members. This relative movement can, by means of transducers, be converted into an electrical output signal. It is desirable for purposes both of calibration and initial adjustment that these two members be accurately, selectively positionable relative to each other. It is an object, then, of this invention to provide a novel construction whereby a pair of members, the relative movement of which is used as a measured dimensional indication, can be accurately, selectively positioned relative to each other along the line of movement to be measured.

It is a general object of this invention to provide novel apparatus for making precise relative adjustments in the distance between two members.

Other objects, features, and advantages of the present invention will become apparent from the subsequent description and the appended claims, taken in conjunction with the accompanying drawings in which:

FIGURE 1 is a side elevational view of adjustment apparatus embodying the features of this invention and shown in assembly relationship with apparatus, only partly shown and including a transducer, for measuring the diameter of a bore;

FIGURE 2 is a front elevational view of the assembly of FIGURE 1; and

FIGURE 3 is a side elevational view of a modified form of adjustment apparatus.

Looking first to FIGURES 1 and 2, an adjustment apparatus 10 is shown as a part of a device for measuring the diameters of bores being honed, which device is shown and described in my copending United States patent application, Serial No. 379,583, filed July 1, 1964.

The adjustment apparatus 10 includes a flat, elongated, stationary base member 12 and a flat elongated movable base member 14. As shown in FIGURES 1 and 2, the base members 12 and 14 are mounted to extend vertically and have their lower ends spaced from each other and resiliently, pivotably connected together by means of a generally, flat spring member 16 which is secured to the lower end of the stationary base member 12 via a support block 18 and bolts 20 and to the lower end of the movable base member 14 via a support block 22 and bolts 24. The opposite or upper end of the movable base member 14 terminates in an end portion 26 which is separated by a transversely extending groove 28 which defines a substantially weakened section. The groove 28 extends, generally parallelly, to the pivot axis of the movable base member 14. The end portion has a threaded bore 30 which is located substantially coaxially with a threaded bore 32 through the stationary base member 12. For a purpose to be presently understood, the bore 30 is of a larger diameter than the bore 32.

An adjustment bolt member 34 has a knurled head 36 at one end and a reduced diameter, threaded portion 38 at the other end which is of a size to threadably engage the smaller bore 32 in the stationary base member 12. In between the head 36 and reduced diameter portion 38 is an enlarged diameter shank having a threaded portion 40, adjacent the end portion 38, which is of a size to threadably engage the larger bore 30 in the movable base member 14. With the bolt member 34 threaded to both of the base members 12 and 14 the latter are generally maintained in spaced parallelism. In order to adjust the distance between the base members 12 and 14 the bolt member 34 is manipulated whereby as it is advanced into the threaded bores 30 and 32 the movable base member 14 is moved away from the stationary base member while as it is retracted the base members 12, 14 are pulled together. In general, the movable base member 14 in its movement pivots about an axis defined by the spring member 16. By providing a difference in diameters between bores 30 and 32 and the corresponding threaded portions 40 and 30, respectively, the amount of relative movement between the base members 12 and 14 in response to the rotation of the bolt member 34 will be determined by the difference between the pitches of the threads. Thus while the bolt member 34 advances or retracts substantially only slight relative movement between the base members 12, 14 will be realized. With this construction then an extremely accurate setting of the distance between the base members can be realized.

As the bolt member 34 is advanced or retracted the spring member 16, because of its flexibility, permits pivotal movement of the movable base member 14 toward the stationary base member 12 and also permits some lateral movement of the movable base member 14. This lateral movement aids in maintaining the enlarged bore 30 in coaxial alignment with the bore 32 and hence helps to prevent binding of the corresponding mating threads on the bolt member 34. The weakened section 28 further helps to prevent binding of the threads by permitting the end portion 26 containing the enlarged bore 30 to bend along an axis parallel to the pivotal axis of the movable base member 14 and hence to maintain the bore 30 in coaxial alignment with the bore 32. Thus the spring 16 by permitting lateral movement of the movable base member 14 corrects for lateral movement of the bore 30 as the movable base member 14 is pivoted about its lower end, while the weakened section 28 corrects the misalignment of skewing of the axis of the bore 30 as a result of the pivoting motion. With the bores 30 and 32 maintained in coaxial alignment the bolt member 34 can be easily manipulated without binding.

For the particular application shown and described in my copending patent application (supra), the stationary base member 12 is mounted at its upper end to a fixed support arm member 40 by means of a spacer block member 42 by bolts 44 and at its lower end by means of a spacer block member 43 by bolts 45. The bolts 45 engage the support arm 40 directly while the spacer block member 42 is secured to the support arm 40 via bolts 47. A movable arm assembly 46 is secured to the support arm member 40 for relative forward and rearward movement therewith by a pair of flat spring members 48 and 50. The specific details of the spring members 48 and 50, support arm member 40 and movable arm assembly 46 do not constitute a part of the present invention and have been omitted for the purpose of simplicity. It is sufficient for the purposes of the present invention that it be understod that the movable arm assembly 46 moves relatively to the support arm member 40 by means of the springs 48, 50 and that the extent of the relative movement therebetween is an indication of a dimension being measured, which in the case of the specific apparatus shown is the diameter of a bore being honed. The movable arm assembly 46 has an outwardly, forwardly extending post 52 which terminates in a contact botton 54. Hence the relative distance or change in relative distance between the support arm member 40 and the movable arm assembly 46 is indicated by the position of the contact botton 54. The stationary base member 12 has an opening 53 in line with the post 52 and through which the post 52 and contact button 54 extend. A transducer 56 is supported on the forward surface of the movable base member 14 and has a gauge contact or plunger 58 extending through a bushing 60 supported in an opening in the base member 14. The bushing 60 and opening 53 are located generally in alignment such that the plunger 58 is engaged by the contact button 44. While various type transducers could be used, for the particular application of my copending application (supra) the transducer is of the variable capacitance type as shown and described in the United States patent to M. M. Arlin, No. 2,908,980 issued October 20, 1959. In the above Arlin patent the variable capacitance is a part of an oscillator circuit with changes in its magnitude causing corresponding changes in the amplitude of an electrical output signal. Looking now to FIGURE 1, these changes in capacitance value are caused by movement of the plunger 58 as moved by the contact button 54. Thus as the relative distance between the movable arm assembly 46 and support arm member 40 changes, a corresponding change in the position of the plunger 58 occurs. The result then is a change in capacitance of the transducer 56 as an indication of the size of the bore being measured by the apparatus of FIGURE 1. The movement of the plunger 58 is critical with small changes providing a substantial change in the magnitude of the output signal as caused by the change in capacitance of the transducer 56. Thus it is important that the apparatus for initially setting and calibrating the transducer 56 be susceptible to accurate, minute changes. The adjustment apparatus 10 provides such accurate, minute adjustments. Thus by manipulating the adjustment bolt 34 the distance between base members 12, 14 and hence the relative positions of the plunger 58 and contact button 54 can be accurately set since substantial movement of the bolt 34 results in only slight movement between base members 12, 14. Note then that with the apparatus of FIGURES 1 and 2, an accurate adjustment can be made in the relative distance between the two gauging members which are the movable base member 14 and movable arm assembly 46.

A modified form of adjustment apparatus is shown in FIGURE 3 and is generally indicated by the numeral 70. There a stationary base portion 72 is formed integrally with a movable base portion 74 the two portions being resiliently, pivotably joined at one end by a connecting portion 76 which has its section reduced substantially by a notch 78 which generally defines the pivotal axis of the movable base portion 74. The base portions 72, 74 extend generally in spaced parallelism and their free ends are readily movable towards each other as a result of the reduced resistance to bending provided by the notch 78 in the connecting portion. Stationary base portion 72 has a bore 80 located proximate its free end and in general coaxial alignment with a threaded bore 82 at the free end of the movable base portion 74. The end portion 84 of movable base portion 74 including the bore 82 is separated from the remainder by means of a transverse notch 86 which produces a substantially weakened section to bending and which extends substantially parallel to the notch 78 or axis of bending of the movable base portion 74. An adjustment bolt 88, similar to bolt 34, has a head portion 90, a reduced section, threaded end portion 92, and an enlarged, threaded shank portion 94. The threaded shank portion 94 threadably engages the threaded bore 82 in the end portion 84 while the reduced diameter portion 92 is smaller than and extends in clearance relation through the bore 80. The stationary portion 72 has a pair of V-shaped knife edges 96 on its rearward surface located on diametrically, transversely opposite sides of the bore 80 and along a diameter generally parallel to the pivot axis of the movable base portion 74. A nut 98 is threaded on the reduced diameter portion 92 and has a plurality of circumferentially spaced, diametrically opposed V-shaped notches 100. The nut 98 is threaded onto the reduced diameter portion 92 until the knife edges 96 are located in a pair of the notches 100. By manipulating the nut 98 a coarse adjustment can be had of the relative distance between base portions 72, 74. Once the distance has been roughly set by the coarse adjustment a final, accurate adjustment can be made by manipulation of the bolt 88. As with the embodiment of FIGURES 1 and 2, the fine adjustment occurs as a result of the difference between the pitches of the threads of the large and small diameter portions 94 and 92, respectively. As either the nut 98 or bolt 88 are manipulated the movable base portion 74 deflects primarily as the result of bending at the connecting portion 76 with the notch 78 facilitating this bending. The notch 86 permits bending of the end portion 84 and aids in maintaining the bores 82 and 80 generally coaxial. Any slight lateral shift therebetween will be accommodated by the engagement between the knife edges 96 and V-grooves 100 which allows the axis of bolt 88 and nut 98 to assume a skewed position. Note, however, that still there is no binding between the engaging threads of the bolt 88 and nut 98. The adjustment apparatus 70 can be used with a transducer similar to transducer 56 of FIGURES 1 and 2 and is shown with such a transducer 102 indicated in phantom. The transducer 102 would be actuated in a manner similar to that of transducer 56 shown in FIGURES 1 and 2.

Thus means have been shown for providing accurate adjustment of the distance between two members.

While it will be apparent that the preferred embodiments of the invention disclosed are well calculated to fulfill the objects above stated, it will be appreciated that the invention is susceptible to modification, variation and change without departing from the proper scope or fair means of the subjoined claims.

What is claimed is:

1. In a measuring apparatus in which the relative distance between two gauging members is used as an indication of a measured dimension and including sensing means for sensing said relative distance and for providing said indication and in which one of the gauging members includes a device for accurately, selectively preadjusting that relative distance, said device comprising: a fixed base structure located on and immovably fixed to the one gauging member, a longitudinally extending, movable base member spaced from and generally overlying said fixed base structure, connecting means resiliently, pivotably connecting one end of said movable base member to said fixed base structure for movement of said movable base member towards or away from said fixed base structure and hence towards or away from the other gauging member, adjustment means connecting the opposite end of said movable base member to said fixed base structure comprising an adjustment bolt having first and second threaded portions with different thread pitches, first and second means each having threaded portions and threadably connecting said first threaded portion of said adjustment bolt with said fixed base structure and said second threaded portion of said adjustment bolt with said movable base member, respectively, such that rotation of said adjustment bolt moves said movable base member relatively to said fixed base structure, and hence relatively to the other gauging member, in accordance with the difference between said different thread pitches, and alignment means for maintaining said threaded portions of said first and second means substantially in coaxial alignment over the range of movement of said movable base member relative to said fixed base structure by manipulation of said adjustment bolt.

2. In a measuring apparatus in which the relative distance between two gauging members is used as an indication of a measured dimension and including sensing means for sensing said relative distance and for providing said indication and in which one of the gauging members includes a device for accurately, selectively preadjusting that relative distance, said device comprising: a fixed base structure located on and immovably fixed to the one gauging member, a longitudinally extending, movable base member spaced from and generally overlying said fixed base structure, connecting means resiliently, pivotably connecting one end of said movable base member to said fixed base structure for movement of said movable base member towards or away from said fixed base structure and hence towards or away from the other gauging member, adjustment means connecting the opposite end of said movable base member to said fixed base structure comprising an adjustment bolt having first and second threaded portions with different thread pitches, first and second means each having threaded portions and threadably connecting said first threaded portion of said adjustment bolt with said fixed base structure and said second threaded portion of said adjustment bolt with said movable base member, respectively, such that rotation of said adjustment bolt moves said movable base member relatively to said fixed base structure, and hence relatively to the other gauging member, in accordance with the difference between said different thread pitches, and alignment means for maintaining said threaded portions of said first and second means substantially in coaxial alignment over the range of movement of said movable base member relative to said fixed base structure by manipulation of said adjustment bolt, said alignment means including a weakened section in a portion including one of said first and second means with said weakened section extending generally parallelly to the pivot axis of said movable base member.

3. In a measuring apparatus in which the relative distance between two gauging members is used as an indication of a measured dimension and including sensing means for sensing said relative distance and for providing said indication and in which one of the gauging members includes a device for accurately, selectively preadjusting that relative distance, said device comprising: a fixed base structure located on and immovably fixed to the one gauging member, a longitudinally extending, movable base member spaced from and generally overlying said fixed base structure, connecting means resiliently, pivotably connecting one end of said movable base member to said fixed base structure for movement of said movable base member towards or away from said fixed base structure and hence towards or away from the other gauging member, said connecting means including a flat spring member connected between said one end of said movable base member and said fixed base structure, adjustment means connecting the opposite end of said movable base member to said fixed base structure comprising an adjustment bolt having first and second threaded portions with different thread pitches, first and second means each having threaded portions and threadably connecting said first threaded portion of said adjustment bolt with said fixed base structure and said second threaded portion of said adjustment bolt with said movable base member, respectively, such that rotation of said adjustment bolt moves said movable base member relatively to said fixed base structure, and hence relatively to the other gauging member, in accordance with the difference between said different thread pitches, and alignment means for maintaining said threaded portions of said first and second means substantially in coaxial alignment over the range of movement of said movable base member relative to said fixed base structure by manipulation of said adjustment bolt, said alignment means including a weakened section in a portion including one of said first and second means with said weakened section extending generally parallelly to the pivot axis of said movable base member.

4. In a measuring apparatus in which the relative distance between two gauging members is used as an indication of a measured dimension and including sensing means for sensing said relative distance and for providing said indication and in which one of the gauging members includes a device for accurately, selectively preadjusting that relative distance, said device comprising: a fixed base structure located on and immovably fixed to the one gauging member, a longitudinally extending, movable base member spaced from and generally overlying said fixed base structure, connecting means resiliently, pivotably connecting one end of said movable base member to said fixed base structure for movement of said movable base member towards or away from said fixed base structure and hence towards or away from the other gauging member, said connecting means including a connecting member connected between said one end of said movable base member and said fixed base structure and having a reduced section portion defining the pivot axis of said movable base member, adjustment means connecting the opposite end of said movable base member to said fixed base structure comprising an adjustment bolt having first and second threaded portions with different thread pitches, first and second means each having threaded portions and threadably connecting said first threaded portion of said adjustment bolt with said fixed base structure and said second threaded portion of said adjustment bolt with said movable base member, respectively, such that rotation of said adjustment bolt moves said movable base member relatively to said fixed base structure, and hence relatively to the other gauging member, in accordance with the difference between said different thread pitches, and alignment means for maintaining said threaded portions of said first and second means substantially in coaxial alignment over the range of movement of said movable base member relative to said fixed base structure by manipulation of said adjustment bolt, said alignment means including a weakened section in a portion including one of said first and second means with said weakened section extending generally parallelly to the pivot axis of said movable base member.

5. In a measuring apparatus in which the relative distance between two gauging members is used as an indication of a measured dimension and including sensing means for sensing said relative distance and for providing said indication and in which one of the gauging members includes a device for accurately, selectively preadjusting that relative distance, said device comprising: a fixed base structure located on and immovably fixed to the one gauging member, a longitudinally extending, movable base member generally located in spaced parallelism relative to said fixed base structure, a flat spring member resiliently, pivotably connecting one end of said movable base member to said fixed base structure for movement of said movable base member towards or away from said fixed base structure and hence towards or away from the other gauging member, a first threaded bore in an end portion at the opposite end of said movable base member in substantial coaxial alignment with a second threaded bore in said fixed base structure, the threads of said first and second bores having different pitches, an adjustment bolt having first and second threaded portions with different thread pitches for threaded engagement with said first and second bores, respectively, such that rotation of said adjustment bolt moves said movable base member relatively to said fixed base structure, and hence relative to the other gauging member, in accordance with the difference between said different thread pitches, a weakened section in said movable base member extending generally parallelly to the pivot axis of said movable base member and separating said end portion from the reminder of said movable base member, said flat spring member and said weakened section cooperating to maintain said first and second threaded bores substantially in coaxial alignment over the range of movement of said movable base member relative to said fixed base structure by manipulation of said adjustment bolt.

6. In a measuring apparatus in which the relative distance between two gauging members is used as an indication of a measured dimension and including sensing means for sensing said relative distance and for providing said indication and in which one of the gauging members includes a device for accurately, selectively preadjusting that relative distance, said device comprising: a fixed base structure located on and immovably fixed to the one gauging member, a longitudinally extending, movable base member spaced from and generally overlying said fixed base structure, connecting means resiliently, pivotably connecting one end of said movable base member to said fixed base structure for movement of said movable base member towards or away from said fixed base structure and hence towards or away from the other gauging member, adjustment means connecting the opposite end of said movable base member to said fixed base structure comprising an adjustment bolt having first and second threaded portions with different thread pitches, first and second means each having threaded portions and threadably connecting said first threaded portion of said adjustment bolt with said fixed base structure and said second threaded portion of said adjustment bolt with said movable base member, respectively, such that rotation of said adjustment bolt moves said movable base member relatively to said fixed base structure, and hence relatively to the other gauging member, in accordance with the difference between said different thread pitches, one of said first and second means including means operative with said adjustment bolt for providing a coarse adjustment of the position of said movable base member relative to said fixed base structure, and alignment means for maintaining said threaded portions of said first and second means substantially in coaxial alignment over the range of movement of said movable base member relative to said fixed base structure by manipulation of said adjustment bolt.

7. In a measuring apparatus in which the relative distance between two gauging members is used as an indication of a measured dimension and including sensing means for sensing said relative distance and for providing said indication and in which one of the gauging members includes a device for accurately, selectively preadjusting that relative distance, said device comprising: a fixed base structure located on and immovably fixed to the one gauging member, a longitudinally extending, movable base member spaced from and generally overlying said fixed base structure, connecting means resiliently, pivotably connecting one end of said movable base member to said fixed base structure for movement of said movable base member towards or away from said fixed base structure and hence towards or away from the other gauging member, adjustment means connecting the opposite end of said movable base member to said fixed base structure comprising an adjustment bolt having first and second threaded portions with different thread pitches, first and second means each having threaded portions and threadably connecting said first threaded portion of said adjustment bolt with said fixed base structure and said second threaded portion of said adjustment bolt with said movable base member, respectively, such that rotation of said adjustment bolt moves said movable base member relatively to said fixed base structure, and hence relatively to the other gauging member, in accordance with the difference between said different thread pitches, one of said first and second means comprising a nut member, and alignment means for maintaining said threaded portions of said first and second means substantially in coaxial alignment over the range of movement of said movable base member relative to said fixed base structure by manipulation of said adjustment bolt, said alignment means including means pivotally securing said nut member to that one of said movable base member and said fixed base structure with which said one of said first and second means is associated for pivotal movement about an axis parallel to the pivot axis of said movable base member.

8. In a measuring apparatus in which the relative distance between two gauging members is used as an indication of a measured dimension and including sensing means for sensing said relative distance and for providing said indication and in which one of the gauging members includes a device for accurately, selectively preadjusting that relative distance, said device comprising: a fixed base structure located on and immovably fixed to the one gauging member, a longitudinally extending, movable base member spaced from and generally overlying said fixed base structure, connecting means resiliently, pivotably connecting one end of said movable base member to said fixed base structure for movement of said movable base member towards or away from said fixed base structure and hence towards or away from the other gauging member, adjustment means connecting the opposite end of said movable base member to said fixed base structure comprising an adjustment bolt having first and second threaded portions with different thread pitches, first and second means each having threaded portions and threadably connecting said first threaded portion of said adjustment bolt with said fixed base structure and said second threaded portion of said adjustment bolt with said movable base member, respectively, such that rotation of said adjustment bolt moves said movable base member relatively to said fixed base structure, and hence relatively to the other gauging member, in accordance with the difference between said different thread pitches, one of said first and second means comprising a nut member, said nut member being threadably rotatably mounted on said adjustment bolt for providing a coarse adjustment of the position of said movable base member relative to said fixed base structure, and alignment means for maintaining said threaded portions of said first and second means substantially in coaxial alignment over the range of movement of said movable base member relative to said fixed base structure by manipulation of said adjustment bolt, said alignment means including means pivotally securing said nut member to that one of said movable base member and said fixed base structure with which said one of said first and second means is associated for pivotal movement about an axis parallel to the pivot avis of said movable base member.

9. In a measuring apparatus in which the relative distance between two gauging members is used as an indication of a measured dimension and including sensing means for sensing said relative distance and for providing said indication and in which one of the gauging members includes a device for accurately, selectively preadjusting that relative distance, said device comprising: a fixed base structure located on and immovably fixed to the one gauging member, a longitudinally extending, movable base member generally located in spaced parallelism relative to said fixed base structure, connecting means resiliently, pivotably connecting one end of said movable base member to said fixed base structure for movement towards or away from said fixed base structure and hence towards or away from the other gauging member, a first bore in an end portion at the opposite end of said movable base member in substantial coaxial alignment with a second bore in said fixed base structure, one of said first and second bores being threaded, an adjustment bolt having first and second threaded portions with different thread pitches with said portions being in threaded engagement with said one of said first and second bores and with said second of said portions passing through the other of said first and second bores in clearance relationship, a nut member in threaded engagement with said second threaded portion and in engagement with that one of said movable base member and said fixed base structure associated with said other of said first and second bores such that rotation of said adjustment bolt moves said movable base member relatively to said fixed base structure, and hence relatively to the other gauging member, in accordance with the difference between said different thread pitches, and means for maintaining said one of said first and second bores and said nut member substantially in coaxial alignment over the range of movement of said movable base member relative to said fixed base structure by manipulation of said adjustment bolt.

10. In a measuring apparatus in which the relative distance between two gauging members is used as an indication of a measured dimension and including sensing means for sensing said relative distance and for providing said indication and in which one of the gauging members includes a device for accurately, selectively preadjusting that relative distance, said device comprising: a fixed base structure located on and immovably fixed to the one gauging member, a longitudinally extending, movable base member generally located in spaced parallelism relative to said fixed base structure, connecting means resiliently, pivotably connecting one end of said movable base member to said fixed base structure for movement towards or away from said fixed base structure and hence towards or away from the other gauging member, a first bore in an end portion at the opposite end of said movable base member in substantial coaxial alignment with a second bore in said fixed base structure, one of said first and second bores being threaded, an adjustment bolt having first and second threaded portions with different thread pitches with said first of said portions being in threaded engagement with said one of said first and second bores and with said second of said portions passing through the other of said first and second bores in clearance relationship, a nut member in threaded engagement with said second threaded portion and in engagement with that one of said movable base member and said fixed base structure associated with said other of said first and second bores such that rotation of said adjustment bolt moves said movable base member relatively to said fixed base structure, and hence relatively to the other gauging member, in accordance with the difference between said different thread pitches, and means for maintaining said one of said first and second bores and said nut member substantially in coaxial alignment over the range of movement of said movable base member relative to said fixed base structure by manipulation of said adjustment bolt, said alignment means including means pivotally securing said nut member to said one of said movable base member and said fixed base structure for pivotal movement about an axis parallel to the pivot axis of said movable base member.

11. In a measuring apparatus in which the relative distance between two gauging members is used as an indication of a measured dimension and including sensing means for sensing said relative distance and for providing said indication and in which one of the gauging members includes a device for accurately, selectively preadjusting that relative distance, said device comprising: a fixed base structure located on and immovably fixed to the one gauging member, a longitudinally extending, movable base member generally located in spaced parallelism relative to said fixed base structure, connecting means resiliently, pivotably connecting one end of said movable base member to said fixed base structure for movement towards or away from said fixed base structure and hence towards or away from the other gauging member, a first bore in an end portion at the opposite end of said movable base member in substantial coaxial alignment with a second bore in said fixed base structure, one of said first and second bores being threaded, an adjustment bolt having first and second threaded portions with different thread pitches with said first of said portions being in threaded engagement with said one of said first and second bores and with said second of said portions passing through the other of said first and second bores in clearance relationship, a nut member in threaded engagement with said second threaded portion and in engagement with that one of said movable base member and said fixed base structure associated with said other of said first and second bores such that rotation of said adjustment bolt moves said movable base member relatively to said fixed base structure, and hence relatively to the other gauging member, in accordance with the different between said different thread pitches, and means for maintaining said one of said first and second bores and said nut member substantially in coaxial alignment over the range of movement of said movable base member relative to said fixed base structure by manipulation of said adjustment bolt, said alignment means including means pivotally securing said nut member to said one of said movable base member and said fixed base structure for pivotal movement about an axis parallel to the pivot axis of said movable base member, said last-named means comprising a pair of knife edges on said one of said movable base member and said fixed base structure and a pair of corresponding slots in said nut member for engagement therewith.

12. In a measuring apparatus in which the relative distance between two gauging members is used as an indication of a measured dimension and including sensing means for sensing said relative distance and for providing said indication and in which one of the gauging members includes a device for accurately, selectively preadjusting that relative distance, said device comprising: a fixed base structure located on and immovably fixed to the one gauging member, a longitudinally extending, movable base member generally located in spaced parallelism relative to said fixed base structure, connecting means resiliently, pivotably connecting one end of said movable base member to said fixed base structure for movement towards or away from said fixed base structure and hence towards or away from the other gauging member, a first threaded bore in an end portion at the opposite end of said movable base member in substantial coaxial alignment with a second bore in said fixed base structure, an adjustment bolt having first and second threaded portions with different thread pitches and with said first threaded portion in threaded engagement with said first threaded bore and with said second threaded portion extending through said second bore, and a nut member in threaded engagement with said second threaded portion and in engagement with said fixed base structure, such that rotation of said adjustment bolt moves said movable base member relative to said fixed base structure, and hence the other gauging member, in accordance with the difference between said different thread pitches, and means for maintaining said first bores and said nut member substantially in coaxial alignment over the range of movement of said movable base member relative to said fixed base structure by manipulation of said adjustment bolt, said last-named means comprising a pair of knife edges located on diametrically opposite sides of said second bore and along a diametrical line parallel to the pivot axis of said movable base member and a pair of correspondingly diametrically opposed slots in said nut member for engagement with said knife edges.

13. In a measuring apparatus in which the relative distance between two gauging members is used as an indication of a measured dimension and including sensing means for sensing said relative distance and for providing said indication and in which one of the gauging members includes a device for accurately, selectively preadjusting that relative distance, said device comprising: a fixed base structure located on and immovably fixed to the one gauging member, a longitudinally extending, movable base member generally located in spaced parallelism relative to said fixed base structure, connecting means resiliently, pivotably connecting one end of said movable base member to said fixed base structure for movement towards or away from said fixed base structure and hence towards or away from the other gauging member, said connecting means including a connecting member connected between said one end of said movable base member and said fixed base structure and having a reduced section portion defining the pivot axis of said movable base member, a first threaded bore in an end portion at the opposite end of said movable base member in substantial coaxial alignment with a second bore in said fixed base structure, an adjustment bolt having first and second threaded portions with different thread pitches and with said first threaded portion in threaded engagement with said first threaded bore and with said second threaded portion extending through said second bore, and a nut member in threaded engagement with said second threaded portion and in engagement with said fixed base structure, such that rotation of said adjustment bolt moves said movable base member relative to said fixed base structure, and hence the other gauging member, in accordance with the difference between said different thread pitches, and means for maintaining said first bores and said nut member substantially in coaxial alignment over the range of movement of said movable base member relative to said fixed base structure by manipulation of said adjustment bolt, said last-named means comprising a pair of knife edges located on diametrically opposite sides of said second bore and along a diametrical line parallel to the pivot axis of said movable base member and a pair of correspondingly diametrically opposed slots in said nut member for engagement with said knife edges.

14. In a measuring apparatus in which the relative distance between two gauging members is used as an indication of a measured dimension and including sensing means for sensing said relative distance and for providing said indication and in which one of the gauging members includes a device for accurately, selectively preadjusting that relative distance, said device comprising: a fixed base structure located on and immovably fixed to the one gauging member, a longitudinally extending, movable base member generally located in spaced parallelism relative to said fixed base structure, connecting means resiliently, pivotably connecting one end of said movable base member to said fixed base structure for movement towards or away from said fixed base structure and hence towards or away from the other gauging member, said connecting means including a connecting member connected between said one end of said movable base member and said fixed base structure and having a reduced section portion defining the pivot axis of said movable base member, a first threaded bore in an end portion at the opposite end of said movable base member in substantial coaxial alignment with a second bore in said fixed base structure, an adjustment bolt having first and second threaded portions with different thread pitches and with said first threaded portion in threaded engagement with said first threaded bore and with said second threaded portion extending through said second bore, and a nut member in threaded engagement with said second threaded portion and in engagement with said fixed base structure, such that rotation of said adjustment bolt moves said movable base member relative to said fixed base structure, and hence the other gauging member, in accordance with the difference between said different thread pitches, a pair of knife edges located on diametrically opposite sides of said second bore and along a diametrical line parallel to the pivot axis of said movable base member, a plurality of pairs of correspondingly diametrically opposed slots in said nut member with each pair being selectively engageable with said knife edges, a weakened section in said movable base member extending generally parallelly to the pivot axis of said movable base member and separating said end portion from the remainder of said movable base member, said knife edges and said slots and said weakened section cooperating to maintain said first threaded bore and said nut member substantially in coaxial alignment over the range of movement of said movable base member relative to said fixed base structure by manipulation of said adjustment bolt.

References Cited by the Examiner
UNITED STATES PATENTS

| | | | |
|---|---|---|---|
| 328,861 | 10/1885 | Richards | 33—154 |
| 877,934 | 2/1908 | Lea | 33—173 |
| 2,299,997 | 10/1942 | Ladrach | 33—148 |
| 2,419,461 | 4/1947 | Neff | 33—148 |
| 3,010,259 | 11/1961 | Greening | 51—34 |
| 3,195,237 | 7/1965 | Aldeborgh | 33—172 |

LEONARD FORMAN, *Primary Examiner.*

W. D. MARTIN, *Assistant Examiner.*

UNITED STATES PATENT OFFICE
CERTIFICATE OF CORRECTION

Patent No. 3,281,944                                        November 1, 1966

Charles W. Youngblood

It is hereby certified that error appears in the above numbered patent requiring correction and that the said Letters Patent should read as corrected below.

Column 5, line 20, strike out "portions", second occurrence; column 8, line 48, for "avis" read -- axis --; line 69, after "said" insert -- first of said --.

Signed and sealed this 5th day of September 1967.

(SEAL)
Attest:

ERNEST W. SWIDER                                    EDWARD J. BRENNER
Attesting Officer                                        Commissioner of Patents